US007309826B2

(12) United States Patent
Morley et al.

(10) Patent No.: US 7,309,826 B2
(45) Date of Patent: Dec. 18, 2007

(54) BROWSER-BASED MUSIC RENDERING APPARATUS METHOD AND SYSTEM

(76) Inventors: Curtis J. Morley, 164 E. 280 North, Orem, UT (US) 84057; Emerson Tyler Wright, 4528 W. Copperpot La., West Jordan, UT (US) 84088

( * ) Notice: Subject to any disclaimer, the term of this patent is extended or adjusted under 35 U.S.C. 154(b) by 390 days.

(21) Appl. No.: 10/934,143

(22) Filed: Sep. 3, 2004

(65) Prior Publication Data

US 2006/0048632 A1 Mar. 9, 2006

(51) Int. Cl.
*G09B 15/00* (2006.01)

(52) U.S. Cl. ...................... 84/483.1; 715/517; 715/518

(58) Field of Classification Search ............... 84/483.1; 715/517, 518

See application file for complete search history.

(56) References Cited

U.S. PATENT DOCUMENTS

| | | | | |
|---|---|---|---|---|
| 5,690,496 A * | 11/1997 | Kennedy | ................ | 434/307 R |
| 5,746,605 A * | 5/1998 | Kennedy | ................ | 434/307 R |
| 6,275,222 B1 * | 8/2001 | Desain | ....................... | 707/203 |
| 2004/0025668 A1 * | 2/2004 | Jarrett et al. | .............. | 84/477 R |

OTHER PUBLICATIONS

Renz, Kai "Algorithms and Data Structures for a Music Notation System based on GUIDO Music Notation." Phd. Dissertation. Aug. 26, 2002 viewed online on November 16 at http://www.noteserver.org/diss_kai_final/diss_final.pdf.* http://www.lds.org/churchmusic/musicPlayer. Viewed online on Mar. 28, 2007. This Web site contains an interactive music player similar to that of the Applicant.*

Tom Gerou and Linda Lusk "Essential Dictionary of Music Notation" p. 308 published by Alfred Publish Co. Inc. Los Angelos.

* cited by examiner

*Primary Examiner*—Lincoln Donovan
*Assistant Examiner*—David S. Warren
(74) *Attorney, Agent, or Firm*—Steve McDaniel; Utah Valley Patent

(57) ABSTRACT

Atomic music segments are visually and sonically rendered within a browser window as directed by a set of interface controls thus providing the ability to directly control various performance parameters while also communicating the intentions of the composer and arranger in a manner similar to traditional sheet music. In certain embodiments, individual voices may be selectively displayed, muted, or attenuated in order to focus a practice session or performance on particular parts. In one embodiment, atomic music segments and their associated lyrics are sequentially highlighted as the music progresses, providing a convenient means for reviewing or practicing music. Each atomic music segment may include one or more notes that have a substantially common onset time, thus providing an essentially indivisible unit of music convenient for user interaction and control.

65 Claims, 10 Drawing Sheets

BROWSER-BASED MUSIC RENDERING APPARATUS METHOD AND SYSTEM

BACKGROUND OF THE INVENTION

1. Field of the Invention

The present invention relates generally to systems and methods for distributing and viewing sheet music and more particularly relates to apparatus methods and systems for browser-based visual and sonic rendering of sheet music.

2. Description of the Related Art

FIG. 1 is an illustration of one example of a prior art published musical selection 100. As depicted, the published musical selection 100 includes a variety of elements and markings that communicate the intended expression of the music printed thereon. The published musical selection 100 enables individuals and groups such as musicians, singers, hobbyist, and churchgoers to practice and perform music composed and arranged by others.

A title 110 identifies the name of the selection being performed. A tempo indicator 112 indicates the intended tempo or speed of performance. A key signature 114 specifies the key in which the music is written. A time signature 118 denotes the unit of counting and the number of counts or beats in each measure 120. The depicted measures 120 are separated by bar lines 122.

A system 130 typically contains a system indicator 131 and one or more staffs 132 composed of staff lines 134 that provide a frame of reference for reading notes 136. The notes 136 positioned on the staff lines 134 indicate the intended pitch and timing associated with a voice or part 140.

The published musical selection 100 may include lyrics 150 consisting of verses 160. Within each verse 160, words 162 and syllables 164 are preferably aligned with the notes 136 in order to suggest the phonetic articulations that are to be sung with each note 136.

The elements associated with the published musical selection 100 are the result of hundreds of years of refinement and provide means for composers and arrangers to communicate their intentions for performing the musical selection. However, the process of formatting published music is typically a very tedious and time consuming process that requires a great deal of precision. Furthermore, adding or changing an instrument or transposing the selection to a new key requires the musical selection to be completely reformatted. Additionally, to be effective the published musical selection 100 typically requires either an accompanist who can play the music, or performers who can sight read the music. In many circumstances, such individuals are in limited supply.

In contrast to the published musical selection 100, a media player 200 provides an alternate means of distributing music. As depicted, the media player 200 includes a play button 210, a stop button 220, a pause button 230, a next track button 240, and a previous track button 250. The media player 200 provides a variety of elements that provide a user with direct control over a musical performance without requiring musical literacy or skill. However, the level of control provided by the media player 200 is quite limited and is typically not useful for practicing and performing music.

What is needed are systems, apparatus, and methods that provide users additional control over a musical performance while also communicating the intentions of the composer and arranger of the music. Preferably, such methods and systems would work within a standard browser and facilitate musical practice and performance for individuals and groups with a wide range of musical skill and literacy.

SUMMARY OF THE INVENTION

The present invention has been developed in response to the present state of the art, and in particular, in response to the problems and needs in the art that have not yet been fully solved by currently available music publishing means and methods. Accordingly, the present invention has been developed to provide an apparatus, system, and method for rendering music that overcomes many or all of the above-discussed shortcomings in the art.

The present invention provides control over performance parameters such as dynamic voice selection and volume control within a standard browser window. The present invention overcomes the performance limitations typically associated with rendering music within a standard browser window through various techniques including formatting music data into units convenient for visual and sonic rendering. Referred to herein as atomic music segments, each note within an atomic music segment has a substantially common onset time enabling multiple notes to be processed as a single functional unit.

The use of atomic music segments, and formatting and rendering techniques associated therewith, enables the present invention to efficiently update a visual representation of sheet music within a standard browser in response to various changes such as transposing a key, disabling a voice, changing an instrument, hiding lyrics, or other user requested preferences or rendering options.

In one aspect of the present invention, a method for rendering music within a browser window includes displaying a song as a sequence of user-selectable atomic music segments, each atomic music segment comprising at least one note, and playing the song in response to a user-initiated event. Additionally, the method may also include sequentially highlighting the atomic music segments as each segment is sonically rendered within the browser window.

In certain embodiments, the internal representation of an atomic music segment has one or more notes with a substantially common onset time and includes a duration indicator that indicates the duration until the next segment (i.e. note onset) within the song. Thus, each atomic music segment is essentially an indivisible unit of music convenient for user interaction and control. In one embodiment, each duration indicator is quantized to a shortest inter-note interval of the song thus reducing the amount of data required to represent a song. Each note may also include a voice indicator that indicates which voice or part the note corresponds to. In one embodiment, the pitch of each note is indicated via an octave indicator and semitone indicator.

The structure used by the present invention to represent atomic music segments facilitates efficient and coordinated visual and sonic rendering of digital sheet music. The atomic music segments may be interspersed with other data elements that facilitate an accurate visual rendering of the sheet music such as system indicators, measure indicators, and annotations. A user is provided with direct control over various performance aspects while the intentions of the composer and arranger are communicated in manner that is consistent with traditional sheet music.

In certain embodiments, a visual rendering of the sheet music is accomplished by rendering the song as a sequence of music systems comprising one or more staffs. In one embodiment, notes are placed on the staffs in a visually appealing manner by computing a default width for each atomic music segment within the system, adjusting the segment width of selected segments in order to encompass their associated lyrics, and proportionally decreasing unadjusted segments to fit the atomic music segments within the available system width.

In another aspect of the present invention, an apparatus and system for rendering music includes, in one embodiment, a visual rendering module configured to display a song as a sequence of user-selectable atomic music segments, each atomic music segment comprising at least one note, and a sonic rendering module configured to play the song in response to a user-initiated event. The visual rendering module may be further configured to highlight a selected atomic music segment within the song, such as the segment currently being played by the sonic rendering module, in response to a change in the playback position.

In one embodiment, the visual rendering module includes a system builder that builds a music system, a segment builder that builds each atomic music segment, a spacing adjuster that adjusts the spacing of segments and staffs to prevent collisions with lyrics, a note renderer that renders basic note shapes, and a detail render that renders slur, ties, annotations, markings, and the like.

The sonic rendering module may be configured with a song loader that receives and loads a song for playback and a sound font loader that receives and loads a note palette or sound font to facilitate dynamic synthesis of notes and chords. Furthermore, the sonic rendering module may also include a playback module that facilitates coordinated visual and sonic rendering of the acoustic music segments that comprise the song, and a transpose module that facilitates transposing a song to a different key.

In addition to the visual and sonic rendering modules, the apparatus and system for rendering music within a browser window may also include as set of interface controls and associated event handlers that enable a user to control the rendering process. In one embodiment, the interface controls include controls that enable a user to control the playback tempo, mute or unmute specific voices, change the volume of each voice, specify a particular instrument, activate or inactivate autoscrolling of the sheet music during playback, include or omit the lyrics of a song, and search the lyrics, titles, and topics of a particular song or library of songs.

The aforementioned elements and features may be combined into a system for rendering music within a browser window. In one embodiment, the system includes a server configured to provide digitally encoded music, a browser-equipped client configured to execute a script, and a browser script configured to display a song as a sequence of user-selectable atomic music segments, and play the song in response to a user-initiated event. In certain embodiments, the browser script is further configured to sequentially highlight the atomic music segments in response to a change in a playback position.

In another aspect of the present invention, a method for rendering music within a browser window includes receiving a note palette, the note palette comprising a plurality of sampled sounds corresponding to a plurality of notes referenced in a song, receiving a plurality of atomic music segments, each atomic music segment comprising one or more notes, and mixing the digital samples that correspond to each note within an atomic music segment to provide a digital audio segment. The described method facilitates real-time dynamic control of the rendering process by a user and facilitates providing options such as changing the tempo of a song and dynamically muting or attenuating a selected voice.

In another aspect of the present invention, a method for rendering music within a browser window includes displaying a song within a browser window, the song comprising at least one music staff, at least one verse, and a plurality of voices, determining a set of selected voices and/or their desired volumes from at least one interface control, and playing the selected voices within the song adjusted to the desired volumes. The method may also include dynamically changing the selected voices and/or their desired volumes during playback. The described method facilitates real-time control of the music rendering process by a user within a standard browser.

In another aspect of the present invention, a method for rendering music within a browser window includes displaying a song within a browser window, the song comprising at least one music system and at least one voice, and automatically scrolling the at least one music system in response to completing playback of a current system. The described method enables a user to view an entire song during playback in an automated manner.

In another aspect of the present invention, a method for rendering music within a browser window includes storing a song as a sequence of atomic music segments and providing the song to a browser-equipped client. In one embodiment, each atomic music segment contains one or more notes, each note within a segment has a substantially common onset time. The described method facilitates efficient distribution and perusal of sheet music.

In another aspect of the present invention, a method for rendering music within a browser window includes receiving a song from a server, the song comprising a plurality of voices, displaying the song within a browser window, reformatting the song in response to a user inactivating a selected voice of the plurality of voices. The described method facilitates loading a song with a large number of voices such as an orchestral score and viewing only those voices that are of interest such as voices corresponding to a specific instrument.

The present invention provides benefits and advantages over currently available music rendering solutions. It should be noted that references throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or maybe learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
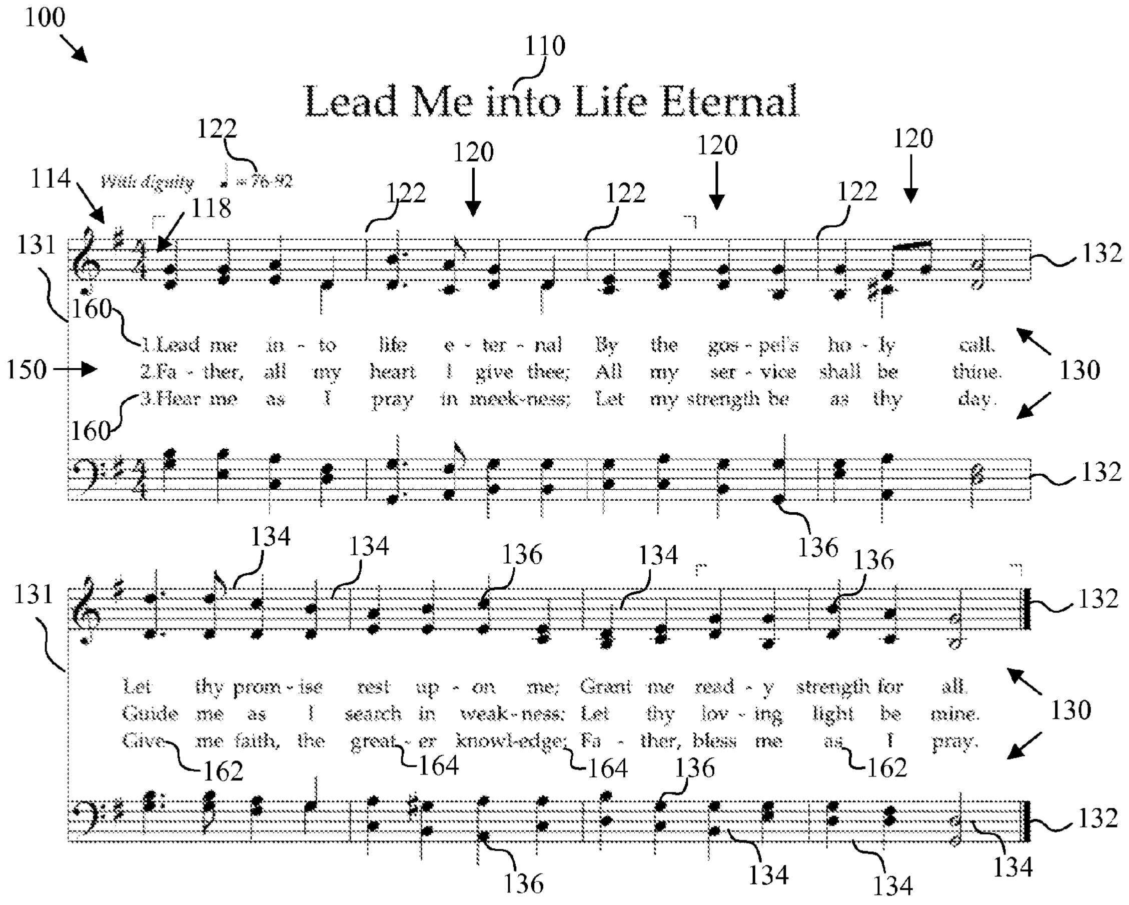
(Prior Art) Fig. 1
FIG. 1 is an illustration of one example of prior art published music.
Figure 2:
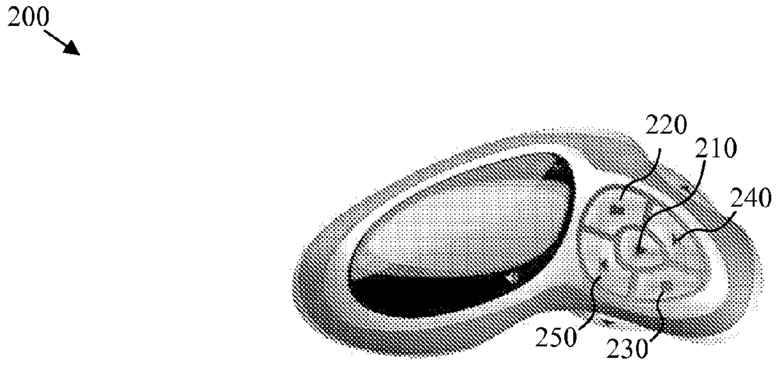
(Prior Art) Fig. 2
FIG. 2 is a screen shot of one embodiment of a prior art media player.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to “one embodiment,” “an embodiment,” or similar language means that a particular feature, structure, or characteristic described in connection with the embodiment is included in at least one embodiment of the present invention. Thus, appearances of the phrases “in one embodiment,” “in an embodiment,” and similar language throughout this specification may, but do not necessarily, all refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

The present invention provides a browser-based apparatus method and system for visual and sonic rendering of sheet music that provides functionality beyond the capabilities of the prior art sheet music and prior art digital media players described in the background section. Specifically, the present invention segments song data into atomic music segments and uses each atomic music segments as a fundamental unit for rendering music. Preferably, each note within an atomic music segment has a substantially common onset time, thus forming an essentially indivisible unit of music convenient for user interaction and control.

The present invention overcomes the performance limitations typically associated with rendering music within a standard browser window. Specifically, the use of atomic music segments enables the present invention to provide real-time control over performance parameters such as voice selection and volume control while operating within a standard browser window.

Furthermore, the use of atomic music segments and formatting techniques associated therewith enables the present invention to efficiently update a visual representation of sheet music in response to various changes such as transposing a key, disabling a voice, changing an instrument, hiding lyrics, or other user requested preferences or rendering options.

Figure 3:
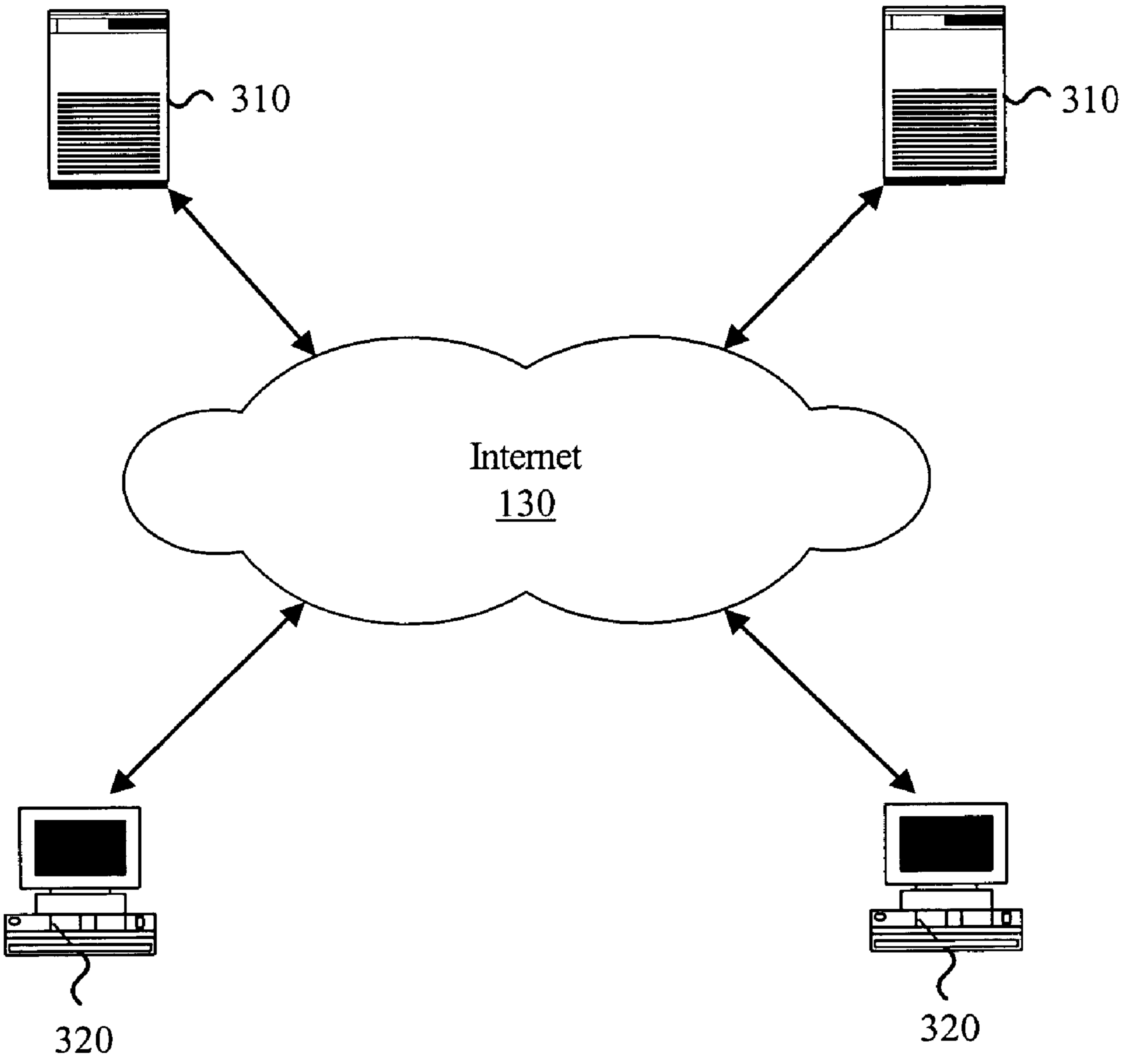
FIG. 3 is a schematic block diagram depicting one embodiment of a music publishing system of the present invention.

FIG. 3 is a schematic block diagram depicting one embodiment of a music publishing system 300 of the present invention. As depicted, the music publishing system 300 includes one or more atomic music servers 310, one or more atomic music clients 320, and an internet 330. The music publishing system 300 facilitates distribution and perusal of electronic sheet music to users of the internet 330 via a conventional browser.

The atomic music servers 310 provide digitally encoded songs 312 to the atomic music clients 320. The digitally encoded songs 312 may be encoded as a sequence of atomic music segments each segment thereof having one or more notes with a substantially common onset time. Providing digitally encoded songs 312 encoded in the aforementioned manner facilitates page-oriented streaming of song data and reduces the latency associated with reviewing music. Furthermore, the sequence of atomic music segments provides convenient units for visual rendering, sonic rendering, and user interaction using a standard browser.

In addition to the digitally encoded songs 312, the atomic music servers 310 may provide one or more atomic music rendering modules (not shown) to the browser-equipped clients 320. In one embodiment, the atomic music rendering modules are provided as a securely encoded Macromedia Flash™ script (i.e. a .swf file).

Figure 4:
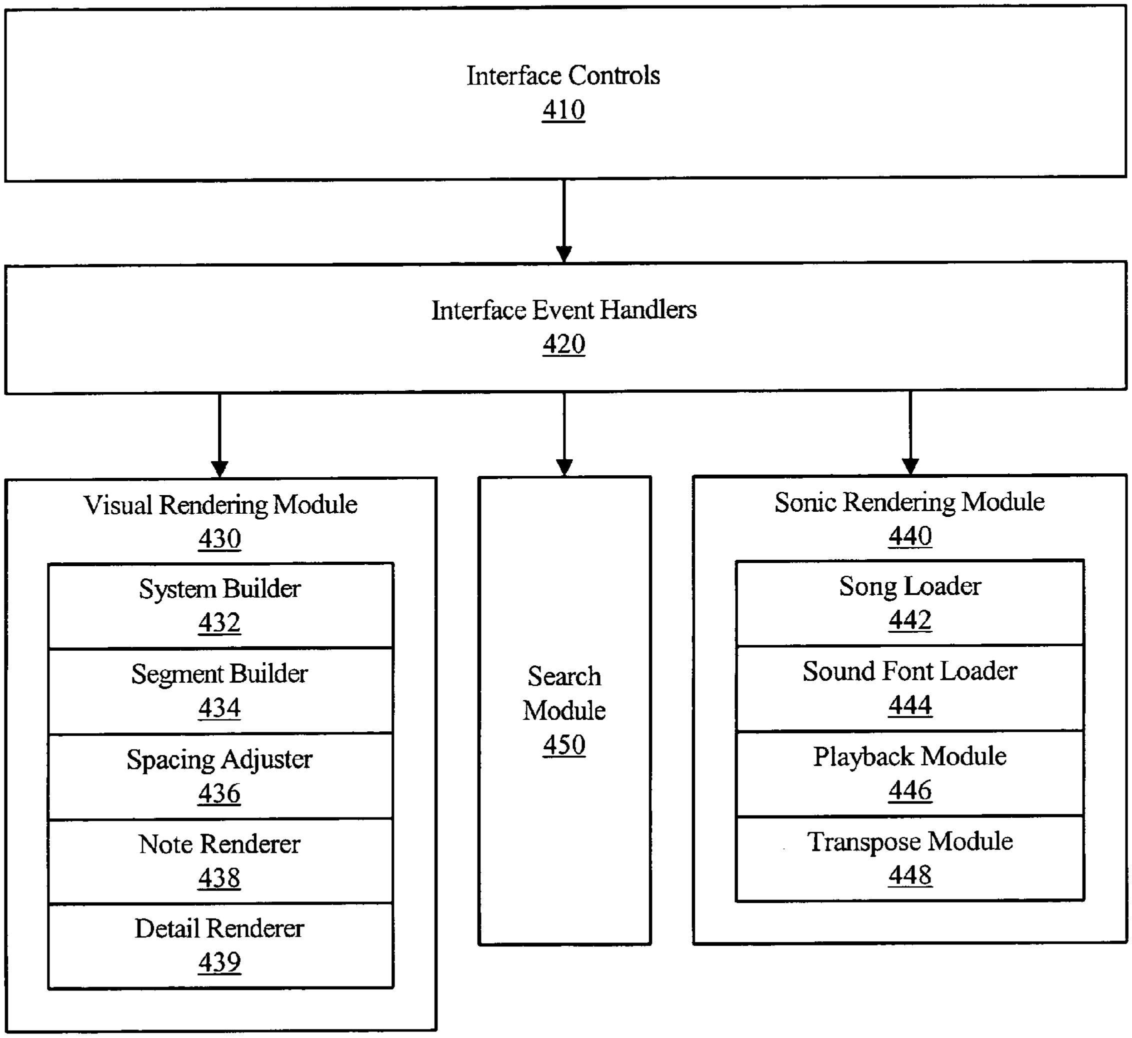
FIG. 4 is a block diagram depicting one embodiment of a music publishing apparatus of the present invention.

FIG. 4 is a block diagram depicting one embodiment of a music publishing apparatus 410 of the present invention. As depicted, the music publishing apparatus 410 includes a set of interface controls 410, one or more interface event handler(s) 420, a visual rendering module 430, a sonic rendering module 440, and a search module 450. In one embodiment, the music publishing apparatus 410 is achieved via one or more scripts provided by a server and executed by a browser.

The interface controls 410 enable a user to control rendering options, and the like, associated with the apparatus 400. In one embodiment, the interface controls 410 enable a user to control volume, tempo, muting of voices, and other audio-related options. The interface controls 410 may also provide control over the visual display of a song. For example, in one embodiment the interface controls 410 enable a user to display music with or without lyrics, autoscroll to a next line of music, and print a song.

In the depicted embodiment, the interface event handlers 420 respond to changes in the interface controls 410 in order to effect the requested changes. For example, if a user mutes a particular voice an interface event handler 420 may inform the sonic rendering module 440 that the particular voice has been muted. An interface event handler 420 may also change one or more variables corresponding to the requested changes or invoke specific procedures to effect the change. For example, in response to a user disabling lyrics via an interface control, an interface event handler may change a lyric display variable and invoke a page redraw function that accesses the lyric display variable.

The visual rendering module 430 displays a song within a browser window. In the depicted embodiment, specific elements of the song are rendered by the various sub-modules which include a system builder 432, a segment builder 434, a spacing adjuster 436, a note renderer 438, and a detail renderer 439. The song may be rendered within the same window as the interface controls 410 or with a separate window.

The system builder 432 builds a system comprising one or more staffs. In one embodiment, the system builder 432 computes an initial estimate of the space needed by the system and allocates a display region within the browser window for building the system. The system builder may draw the staffs within the allocated display region upon which notes corresponding to one or more voices will be rendered. In addition, the system builder may draw staff markings and allocate space for measure indicators and the like.

The segment builder 434 builds individual music segments within a system. The segments may be atomic segments having one or more notes with a substantially common onset time and one or more lyric segments that correspond to the notes. Under such an arrangement, the onset of all the notes of the segment may be within a single quantization interval and treated as an atomic unit for both visual and sonic rendering. In one embodiment, the segment builder 434 computes a default width for each segment based on the duration of the segment and number of segments within the system.

The spacing adjuster 436 may adjust the spacing provided by the system builder 432 and the segment builder 434. For example, the width of particular segments may be increased by the spacer adjuster 436 in order to encompass lyrics that exceed the width of that segment, and the width of other segments may be decreased to accommodate those segments whose widths are increased. In addition to adjusting the (horizontal) width of segments, the spacing adjuster 436 may also adjust the vertical space between staffs to prevent collisions between notes and lyrics.

The note renderer 438 renders the basic notes of each segment within the system being rendered. The detail renderer 439 renders additional details such as slurs, ties, and annotations that result in a highly polished visual rendering of each system in the song.

The sonic rendering module 440 plays the visually rendered song in response to a user-initiated event such as depressing a play control (not shown). In the depicted embodiment, playing the visually rendered song is accomplished via a number of sub-modules including a song loader 442, an optional sound font loader 444, a playback module 446, and a transpose module 448. The various modules of the sonic rendering module 440 facilitate coordinated visual and sonic rendering of music such as sequentially highlighting music segments synchronous to playback (i.e. sonic rendering) of the segments.

The song loader 442 loads a song within a locally accessible location. In one embodiment, the song loader 442 retrieves a digitally encoded song 312 from an atomic music server 310 as described in the description of FIG. 3. In certain embodiments, the song loader 442 may convert a track-based song encoding to a segment-based song encoding preferable for use with the present invention.

The optional sound font loader 444 may load a sound font associated with a song or a sound font selected by a user. In certain embodiments, the sound font is a set of digital audio segments that correspond to notes. In one embodiment, the sound font is restricted to those notes that are referenced in the song.

The playback module 446 plays the loaded song in response to a user-initiated event or the like. Playback is preferably synchronized with visual rendering such as highlighting each music segment as it is played. Synchronized playback may be accomplished via a callback function invoked by a segment-oriented player. For example, a segment-oriented player may activate the notes within a music segment and invoke a highlight function within the visual rendering module to de-highlight the previously highlighted segment and highlight the current music segment.

The transpose module 448 transposes the notes within a song in response to a user request or the like. In certain embodiments, the transpose module 448 shifts each note within each music segment up or down a selected number of half-steps and invokes a redraw function to update the visual rendering of the song. Updating the visual rendering of the song may include adjusting the spacing between staffs to account for the vertical shifting of notes. Updating may also include respacing the atomic music segments for various factors such as a change in the available system space due to a key signature change.

The search module 450 enables a user to search one or more songs for specific words or topics. In one embodiment, a search may be conducted on the lyrics of the currently loaded song, or the titles, topics, or lyrics of songs within a library of songs stored on a selected server.

Figure 5:
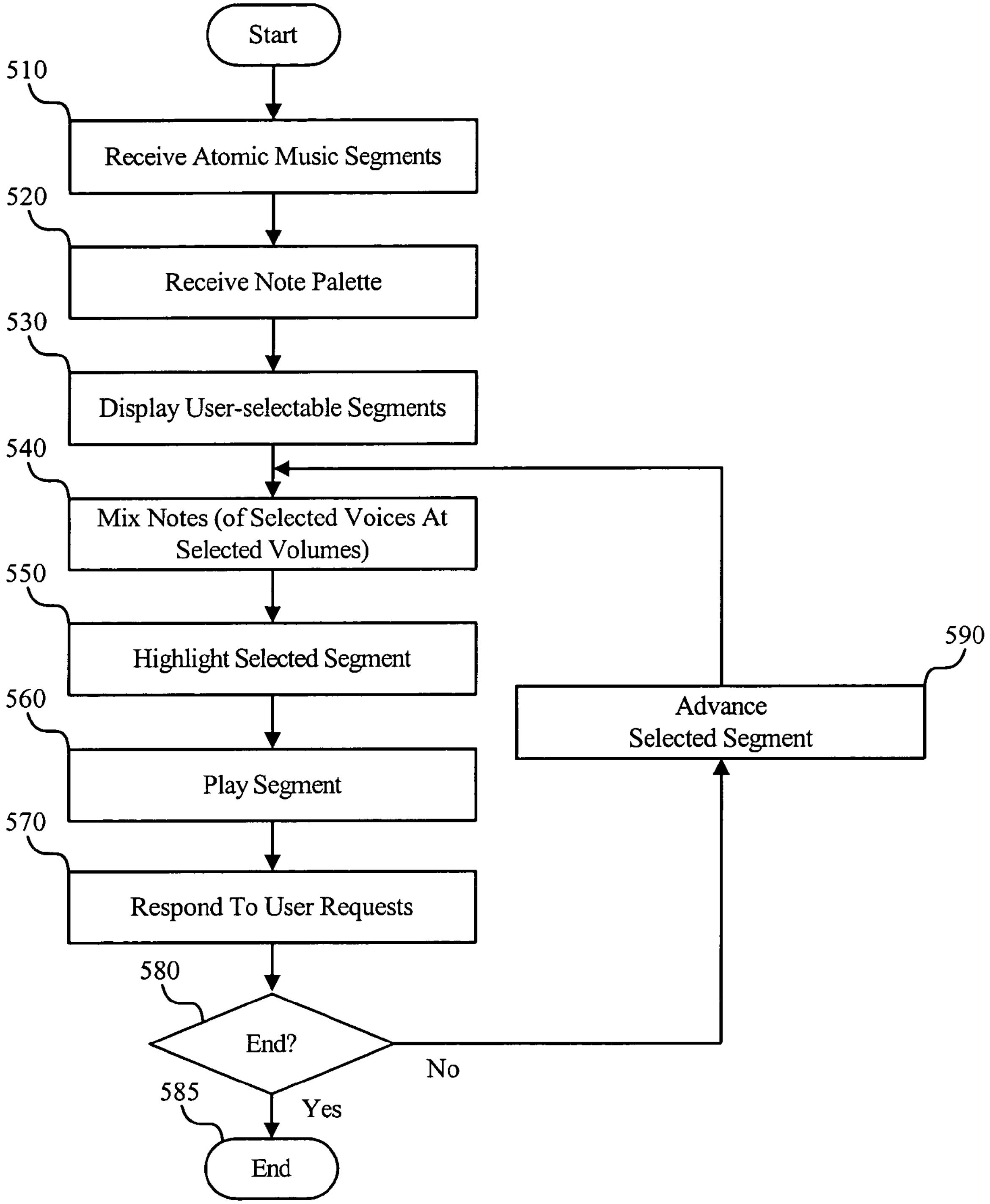
FIG. 5 is a flow chart diagram depicting one embodiment of a music rendering method of the present invention.

FIG. 5 is a flow chart diagram depicting one embodiment of a music rendering method 500 of the present invention. As depicted, the music rendering method 500 includes a receive segments step 510, a receive palette step 520, a display segments step 530, a mix notes step 540, a highlight selected segment step 550, a play segment step 560, an advance segment step 570, and a respond to requests step 580. The music rendering method 500 may be conducted in conjunction with, or independent of, the music publishing apparatus 400 and provides visual and sonic rendering of sheet music in an efficient coordinated manner. While depicted in a certain order, the steps of the depicted method may be rearranged in an order most suitable for the environment in which it is deployed.

The receive segments step 510 receives one or more music segments to be visually and sonically rendered within a browser or the like. In one embodiment, the music segments are provided as a digitally encoded song such as the digitally encoded song 312. The receive palette step 520 receives a sound palette, or the like, for use with the music segments received in step 510. In one embodiment, the sound palette is a set of audio segments corresponding to notes of a particular instrument. The receive palette step is an optional step that may not be needed in certain embodiments.

The display segments step 530 displays the received segments in a browser window or the like. The display segments step 530 may be conducted in the manner described previously in the description of the visual rendering module 430 of FIG. 4 or subsequently in the system formatting method of FIG. 10.

The mix notes step 540 mixes the notes of the next segment to be played. In one embodiment, the mix notes step 540 involves invoking a play function for each active note by referencing a corresponding digital audio segment from a sound palette and specifying an envelope for the digital audio segment that corresponds to the selected volume for the voice and the specified note duration. Invoking a play function in such a manner for each note reduces the required size of the sound palette, provides for efficient processing, and provides for dynamic voice selection and volume control. In another embodiment, the mix notes step 540 sums digital audio segments from a sound font or sound palette into a next note. Preferably, only notes corresponding to active voices are mixed at volume levels prescribed by one or more interface controls.

The highlight selected segment step 550 highlights the currently selected segment. In one embodiment, the currently selected segment is automatically advanced as the music progresses from segment to segment and corresponds to the next note mixed in step 540. Subsequently or concurrently to step 550, the play segment step 560 plays the next segment in the song. In one embodiment, the next segment is the selected segment that is highlighted in step 550.

The respond to requests step 570, responds to user requests such as volume changes or the like. One embodiment of step 570 is the interface service method 1100 depicted in FIG. 11.

The end test 580 ascertains whether playback should end. In one embodiment, playback should end if a user activates a stop control or the song has ended. If playback should end, the method ends 585. If playback should continue, the method loops to the advance selected segment step 590. The advance selected segment step 590 automatically advances the selected segment to the next segment to be played. Subsequently, the depicted method continues by looping to the mix notes step 540.

Figure 6:
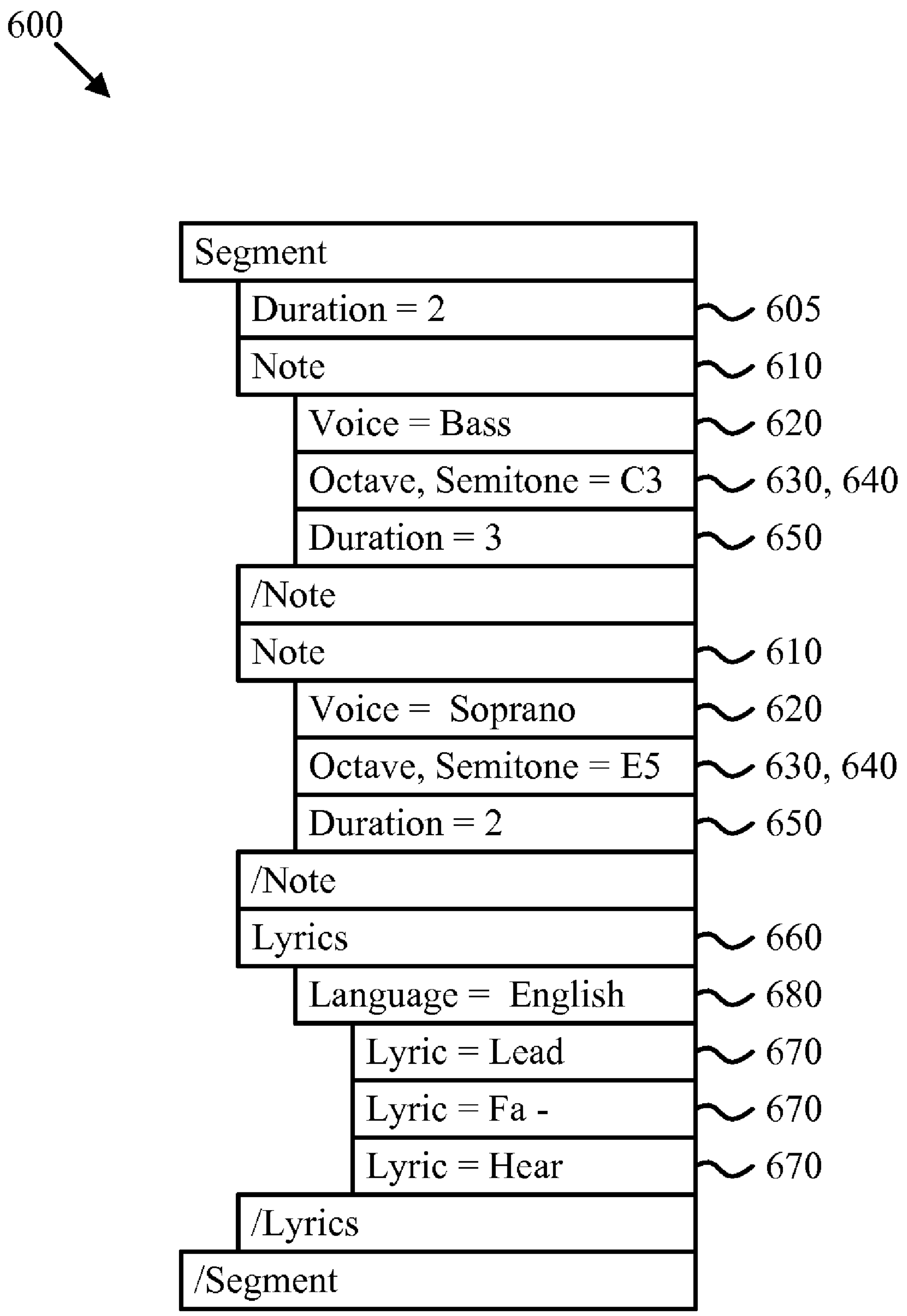
FIG. 6 is a text-based diagram depicting one embodiment of an atomic segment data structure of the present invention.

FIG. 6 is a text-based diagram depicting one embodiment of an atomic segment data structure 600 of the present invention. The depicted atomic segment data structure 600 includes a segment duration 605, one or more notes 610 with voice, octave, semitone, and duration indicators 620, 630, 640, and 650 and may include one or more lyric segments 660. The atomic segment data structure 600 facilitates coordinated visual and sonic rendering of music in an efficient manner.

The segment duration 605 indicates the duration of the music segment. In one embodiment, the duration is a quantized value representing the number of fundamental time units until the next music segment. The notes 610 indicate the notes that are to be activated within the music segment. The voice indicator 620 indicates which voice a particular note is associated with.

The octave and semitone indicators 630 and 640 indicate the octave and semitone to be played. The duration indicator 650 indicates the duration of the note. In one embodiment, each note begins at approximately the same time. However, the notes may have a duration 650 that is different that the segment duration 605 and may exceed the segment duration 605.

The lyric segments 660 contain the lyrics 670 associated with the music segment. In certain embodiments, the lyric segments 660 also include a language indicator 680.

Figure 7:
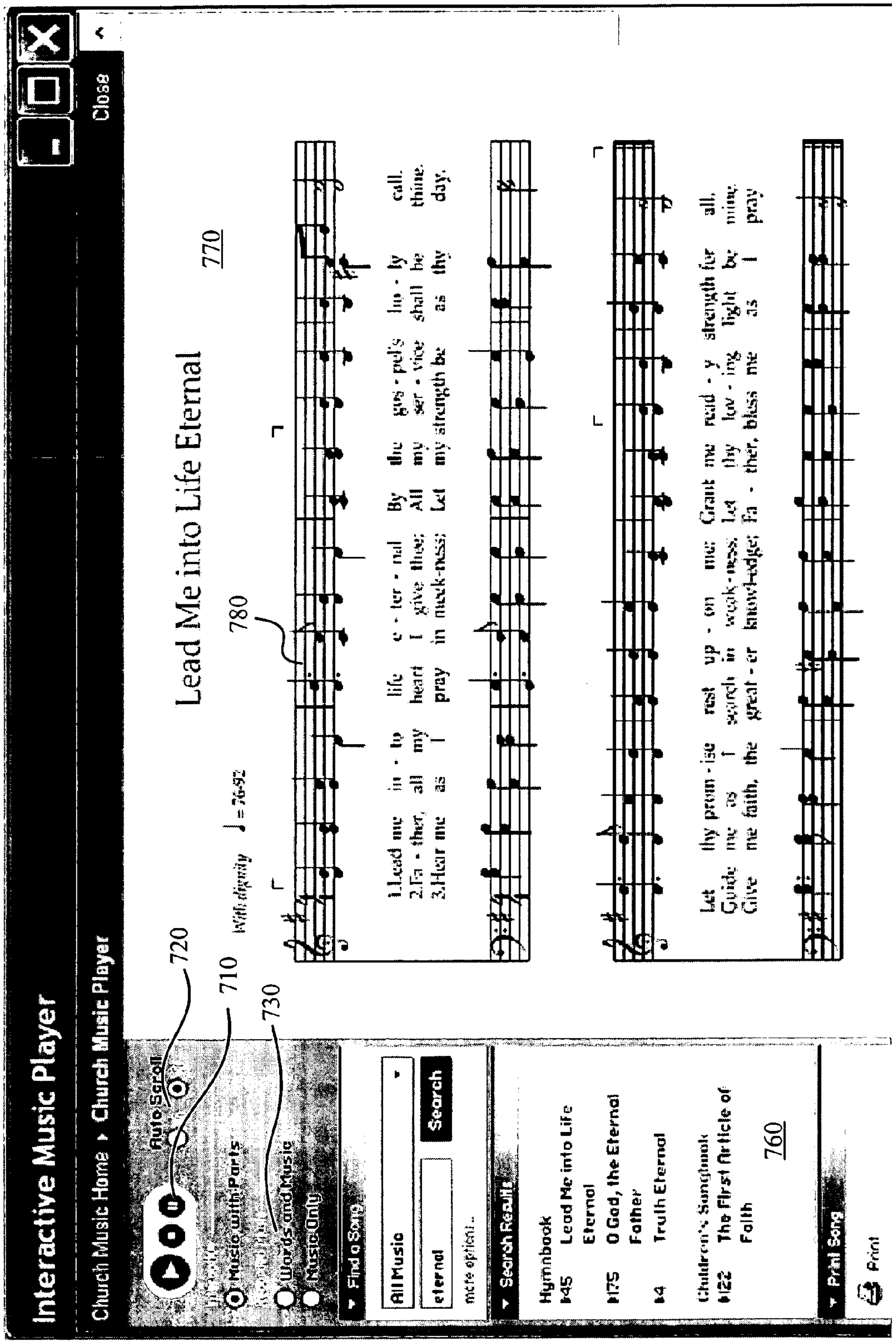
FIG. 7 is a screen shot depicting one embodiment of an upper portion of a music rendering interface of the present invention.

FIG. 7 is a screen shot depicting one embodiment of an upper portion of a music rendering interface 700 of the present invention. The depicted music rendering interface 700 includes a number of interface controls such as play controls 710, an autoscroll control 720, lyric controls 730, one or more print controls 740, and search controls 750. Additionally, the music rendering interface 700 includes a search results pane 760 and a sheet music pane 770 with a visual rendering of the currently selected song. The music rendering interface 700 provides a user with an interactive environment for reviewing, practicing, and performing music.

The depicted play controls 710 enable a user to start, stop, and pause a sonic rendering of the current selection. The autoscroll control 720 enables a user to activate an autoscroll feature which facilitates automated viewing of the system currently being played. The depicted lyric controls 730 enable a user to selectively view the lyrics. In another undepicted embodiment, a language selector enables a user to specify a language for the displayed lyrics.

The print controls 740 enable a user to generate a printed copy of the music. The depicted search controls 750 facilitate a user to conduct a search of a song library. In another embodiment, the search controls facilitate finding specific words in the current selection. The search pane 760 displays results of a user requested search.

The depicted sheet music pane 770 is organized as a set of user-selectable atomic music segments including a highlighted segment 780. In one embodiment, the highlighted segment 780 corresponds to the current playback position of a sonic rendering of the current selection.

Figure 8:
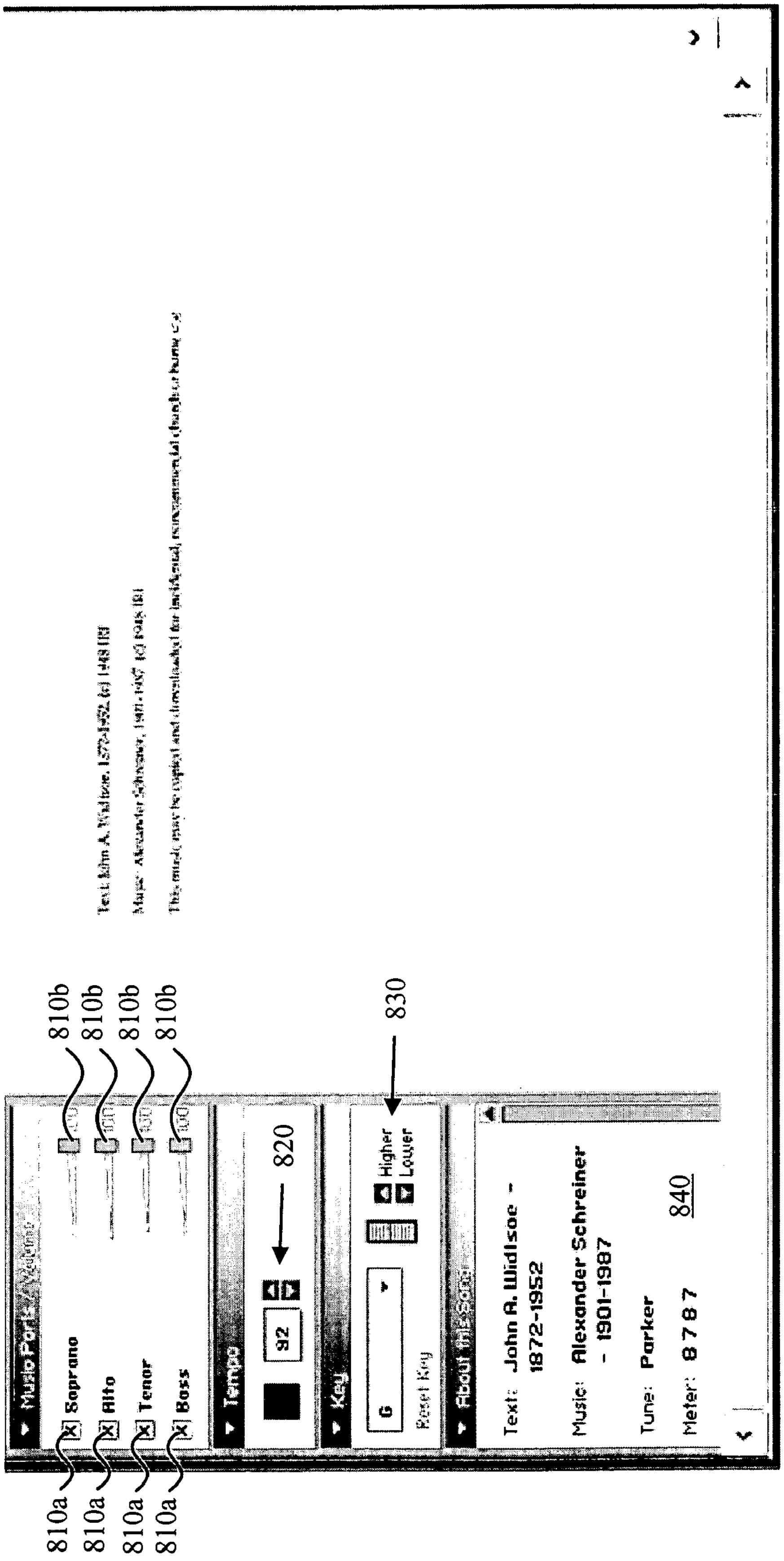
FIG. 8 is a screen shot depicting one embodiment of a lower portion of a music rendering interface of the present invention.

FIG. 8 is a screen shot depicting one embodiment of a lower portion of the music rendering interface 700 of the present invention. In addition to the previously introduced elements, the depicted music rendering interface 700 includes a set of voice controls 810 including muting controls 810*a* and volume controls 810*b*, one or more tempo controls 820, one or more transpose controls 830, and an information pane 840.

The voice controls 810 enable a user to selectively control the balance of the various voices or parts in a song. The depicted muting controls 810*a* enable a user to dynamically mute or unmute each voice. In one embodiment, the visual rendering of the sheet music pane 770 is redrawn to hide muted voices. The depicted volume controls 810*b* enable a user to dynamically adjust the playback volume of each voice.

In another embodiment, a separate set of voice display controls (not shown) enable a user to visually hide individual parts or voices such that the music pane 770 is respaced and redrawn showing only the visually selected voices. Having separate voice display controls and muting controls provides a user to increase flexibility over prior art solutions.

The depicted information pane 840 displays information about the current selection such as the author of the lyrics, the composer of the music, a tune name, and a meter pattern. The tempo controls 820 facilitate adjusting the playback tempo. In one embodiment, the tempo may be dynamically adjusted during playback. The transpose controls 830 enable a user to transpose a song a selected number of half-steps.

Figure 9:
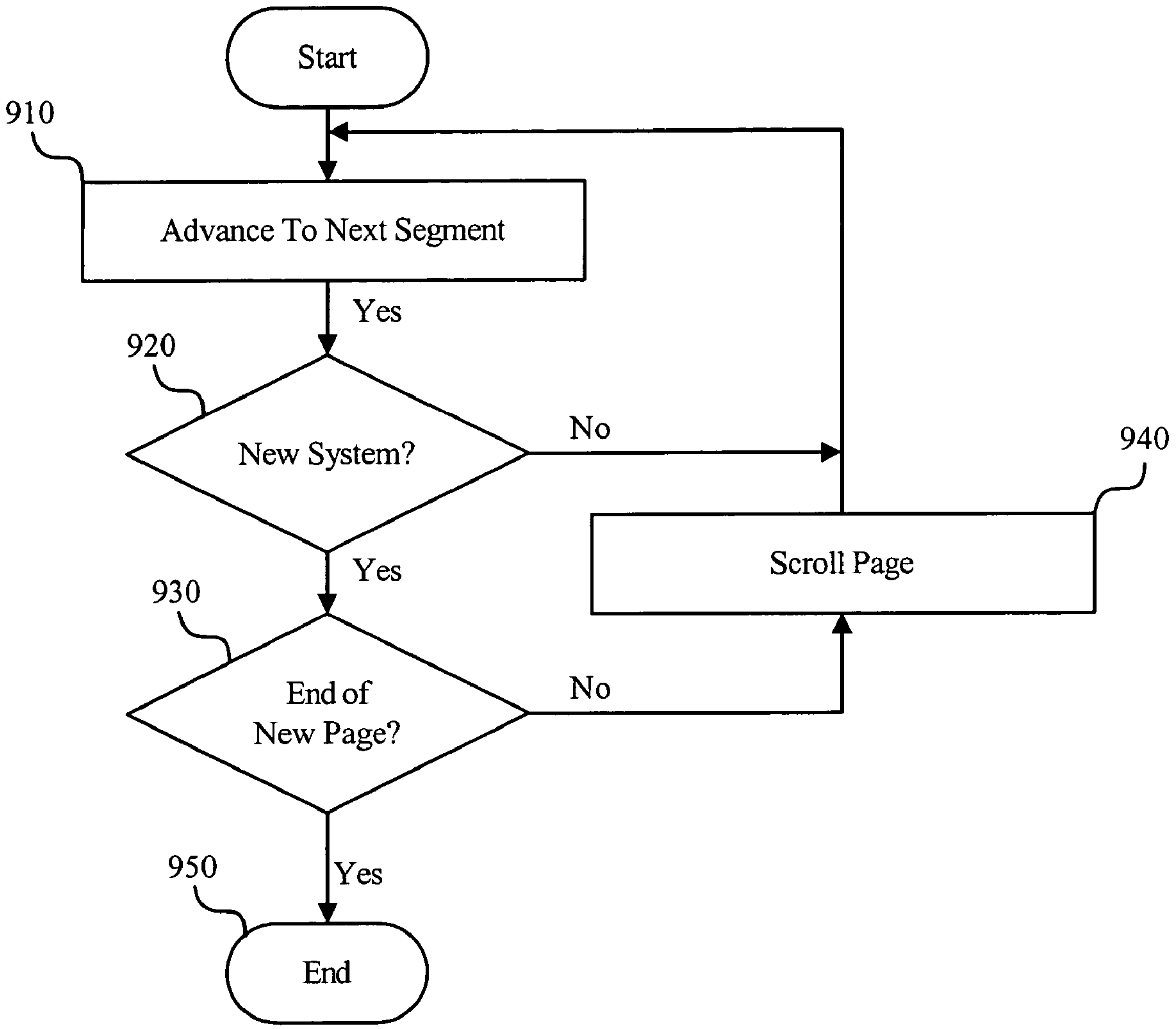
FIG. 9 is a flow chart diagram depicting one embodiment of a page scrolling method of the present invention.

FIG. 9 is a flow chart diagram depicting one embodiment of a page scrolling method 900 of the present invention. As depicted, the page scrolling method 900 includes a next segment step 910, a new system test 920, an end of page test 930, and a scroll page step 940. The page scrolling method 900 may be conducted in conjunction with the music publishing apparatus 400 depicted in FIG. 4 or the music rendering method 500 depicted in FIG. 5. While the depicted method assumes a single sheet of auto-scrolled music, one of skill in the art will recognize how the method 900 may be extended to other scenarios.

The next segment step 910 advances to the next segment in a song. Advancing to the next segment may include waiting for a timeout event that indicates completion of the current segment. In one embodiment, advancing to the next segment also involves traversing a linked list of data structures containing a description of each segment and their associated notes and lyrics. The new system test 920 ascertains whether the next segment is on a new system. If not, the method loops to the next segment step 910. If the next segment is on a new system, the method proceeds to the end of page test 930.

The end of page test 930 ascertains whether the end of a page of sheet music has been reached. If the end of the page has been reached, the method ends 950. If the end of the page has not been reached, the method loops to the scroll page step 940. The scroll page step 940 scrolls a page of sheet music such that the new system is in a viewable location such as near the top or middle of a browser window. Subsequent to the scroll page step 940, the method loops to the next segment step 910 and continues processing.

Figure 10:
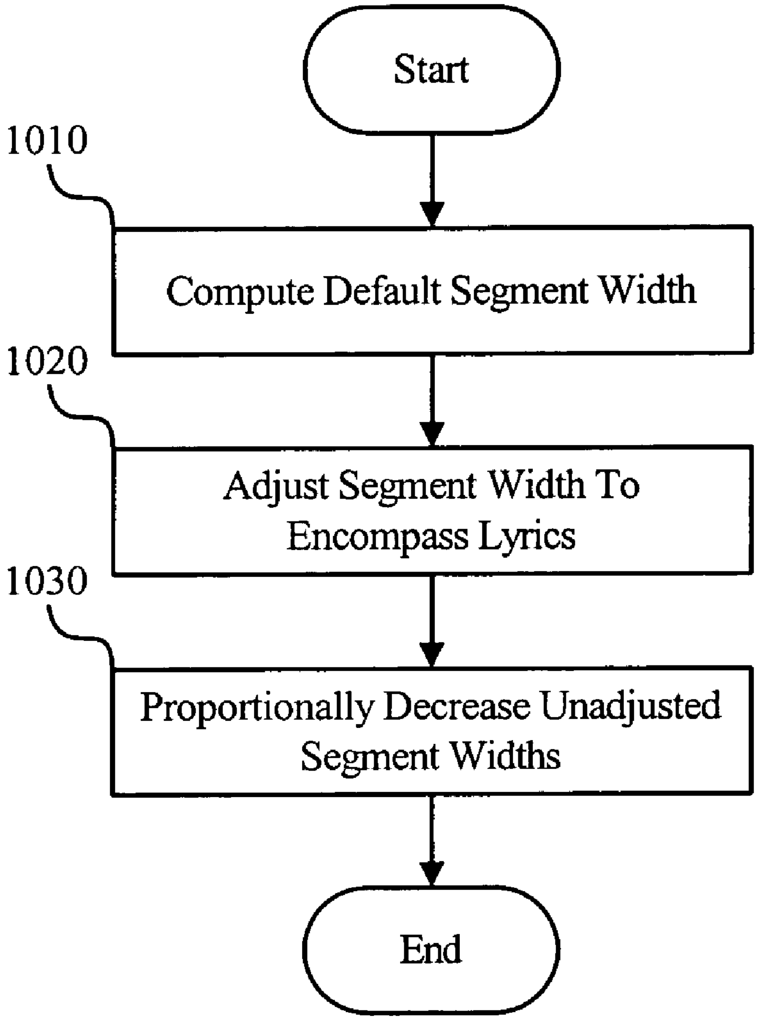
FIG. 10 is a flow chart diagram depicting one embodiment of a system formatting method of the present invention.

FIG. 10 is a flow chart diagram depicting one embodiment of a system formatting method 1000 of the present invention. As depicted, the system formatting method 1000 includes a compute default widths step 1010, an adjust segment widths step 1020, and a decrease unadjusted widths step 1030. The system formatting method 1000 facilitates displaying a page of sheet music in an aesthetic yet efficient manner.

The compute default widths step 1010 computes a default width for each segment in a system. The default width may be expressed in units of pixels or similar convenient units such as percentage of the system width. In one embodiment, the space available on the system for rendering segments is proportionally allocated as a weighted average of the available width per segment and the available width per duration count.

The adjust segment widths step 1020, adjusts the width of certain segments from their computed defaults. In one embodiment, segments having lyrics which exceed their default width are adjusted such that their widths encompass their associated lyrics. To account for the additional width allocated for encompassing lyrics, the decrease unadjusted widths step 1030 decreases the width of unadjusted segments to bring the total system width below the available rendering space. In one embodiment, the width of each unadjusted segment is proportionally decreased in order to match the total width of all of the segments to the space available on the system for rendering segments.

Figure 11:
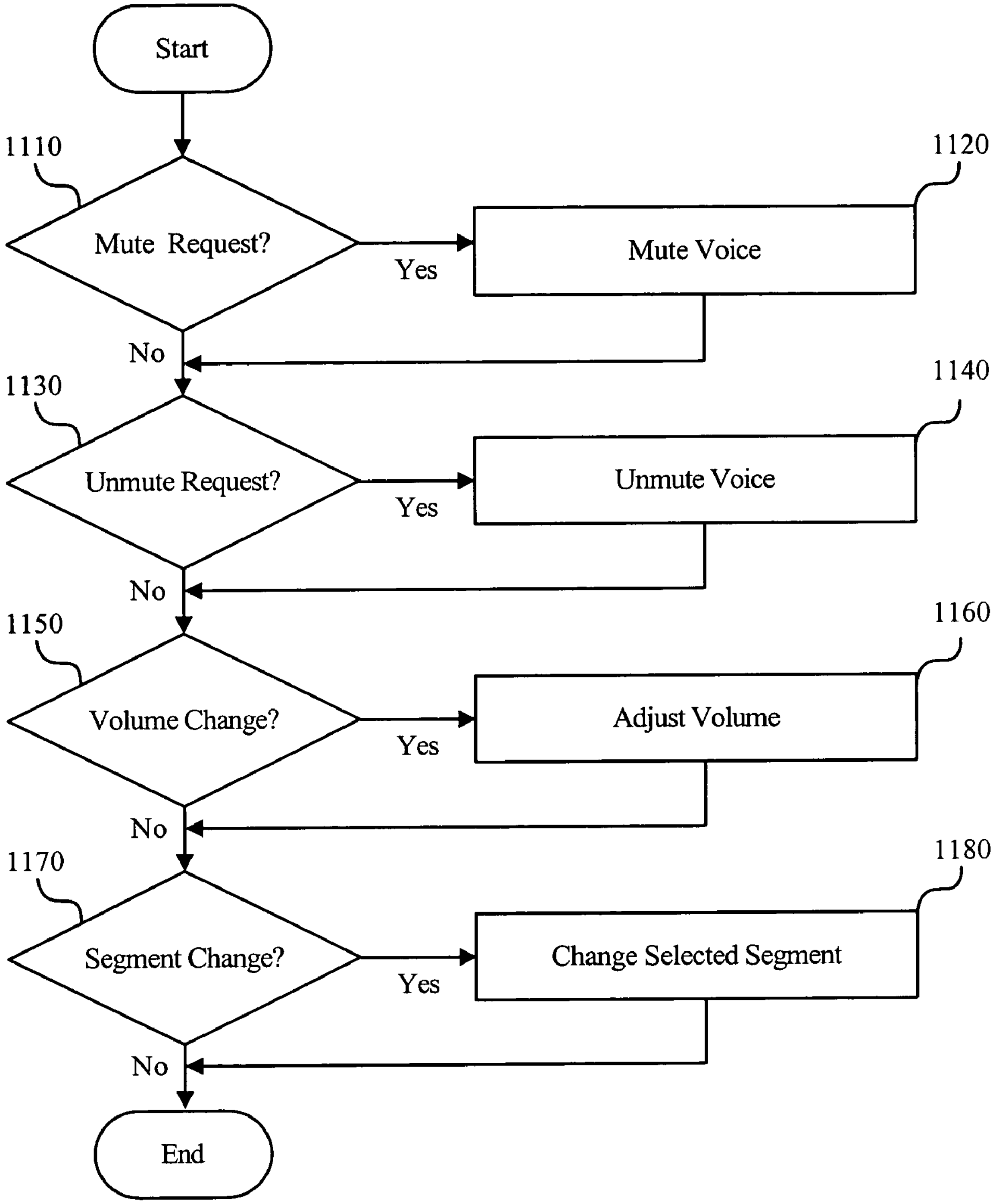
FIG. 11 is a flow chart diagram depicting one embodiment of an interface service system method of the present invention.

FIG. 11 is a flow chart diagram depicting one embodiment of an interface service method 1100 of the present invention. As depicted, the interface service method 1100 includes a mute test 1110, a mute step 1120, an unmute test 1130, an unmute step 1140, a volume test 1150, an adjust volume step 1160, a segment change test 1170, and a change segment step 1180. The interface service method 1100 facilitates dynamic changes in sonic rendering options during playback of song.

The mute test 1110 ascertains if a mute request has occurred. If a mute request has occurred the selected voice is muted 1120. Similarly, the unmute test 1130 ascertains if an unmute request has occurred. If an unmute request has occurred the selected voice is unmuted 1140.

The volume test 1150 ascertains if a volume change request has occurred. If a volume change request has occurred the volume of the selected voice is adjusted 1160. The segment change test 1170 ascertains if a user has selected a different playback position. In one embodiment, a different playback position is selected by clicking on a segment corresponding to a desired playback position. If the user has selected a different playback position the segment is changed 1180 to the indicated segment.

The present invention provides a browser-based apparatus, method, and system for rendering sheet music. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for rendering music within a browser window, the method comprising:

receiving a song with a browser, the song comprising a plurality of notes and a plurality of lyric segments, the plurality of notes and the plurality of lyric segments partitioned into a time progressive sequence of atomic music segments, each atomic music segment comprising:

a duration indicator that indicates a duration of the atomic music segment, a note indicator for each note within the song having an onset time that corresponds to an onset time for the atomic music segment, and a lyric segment for each lyric within the song having an onset time that corresponds to the onset time for the atomic music segment;

computing a segment width for each atomic music segment within a particular music system;

allocating a display region within a browser window for each atomic music segment within the particular music system, each display region having a display width that corresponds to the segment width for the corresponding atomic music segment; and rendering a note body for each note of each atomic music segment within the particular music system within the display region corresponding to each atomic music segment.

2. The method of claim 1, further comprising highlighting the display region for a selected atomic music segment within the song to provide a highlighted atomic music segment.

3. The method of claim 2, wherein the selected atomic music segment progresses in response to a playback position.

4. The method of claim 2, wherein the selected atomic music segment is selected in response to a user-initiated event.

5. The method of claim 1, wherein the duration indicator corresponds to a shortest note duration for the notes corresponding to the atomic music segment.

6. The method of claim 1, further comprising computing a default width for each atomic music segment within the particular music system.

7. The method of claim 6, further comprising increasing a segment width to encompass a lyric.

8. The method of claim 7, further comprising decreasing unadjusted segments to fit the atomic music segments within an available system width.

9. The method of claim 8, wherein decreasing unadjusted segments comprises proportionally decreasing the unadjusted segments.

10. The method of claim 1, further comprising providing a note palette to the browser-equipped client.

11. The method of claim 1, further comprising interspersing the sequence of atomic music segments with measure indicators.

12. The method of claim 1, further comprising interspersing the sequence of atomic music segments with annotations.

13. The method of claim 1, further comprising interspersing the sequence of atomic music segments with system indicators.

14. The method of claim 1, wherein a note indicator comprises a semitone and octave indicator.

15. The method of claim 1, wherein each note indicator comprises a voice indicator.

16. The method of claim 1, wherein a note indicator indicates a rest.

17. The method of claim 1, wherein each atomic music segment comprises at least one lyric segment.

18. The method of claim 17, wherein a lyric segment corresponds to a verse.

19. The method of claim 17, wherein a lyric segment is a word.

20. The method of claim 17, wherein a lyric segment is a syllable.

21. An apparatus for rendering music within a browser window, the method comprising:

a visual rendering module configured to display a song comprising a plurality of notes and a plurality of lyric segments, the plurality of notes and the plurality of lyric segments partitioned into a time progressive sequence of atomic music segments, each atomic music segment comprising:

a duration indicator that indicates a duration of the atomic music segment, a note indicator for each note within the song having an onset time that corresponds to an onset time for the atomic music segment, and a lyric segment for each lyric within the song having an onset time that corresponds to the onset time for the atomic music segment;

the visual rendering module further configured to compute a segment width for each atomic music segment within a particular music system;

the visual rendering module further configured to allocate a display region within a browser window for each atomic music segment within the particular music system, each display region having a display width that corresponds to the segment width for the corresponding atomic music segment;

the visual rendering module further configured to render a note body for each note of each atomic music segment within the particular music system within the display region corresponding to each atomic music segment; and a sonic rendering module configured to play the song in response to a user-initiated event.

22. The apparatus of claim 21, wherein the visual rendering module is further configured to highlight the display region for a selected atomic music segment within the song.

23. The apparatus of claim 22, wherein the visual rendering module is further configured to advance the selected atomic music segment in response to a change in the playback position.

24. The apparatus of claim 22, wherein the visual rendering module is further configured to change the selected atomic music segment in response to a user-initiated event.

25. The apparatus of claim 21, wherein each atomic music segment further comprises a duration indicator.

26. The apparatus of claim 25, wherein the duration indicator corresponds to a shortest note duration for the notes corresponding to the atomic music segment.

27. The apparatus of claim 21, wherein the visual rendering module is further configured to compute a default width for each atomic music segment.

28. The apparatus of claim 27, wherein the visual rendering module is further configured to increase a segment width to encompass a lyric.

29. The apparatus of claim 28, wherein the visual rendering module is further configured to decrease unadjusted segments to fit the atomic music segments within an available system width.

30. The apparatus of claim 28, wherein the visual rendering module is further configured to proportionally decrease unadjusted segments to fit the atomic music segments within an available system width.

31. The apparatus of claim 21, wherein the sonic rendering module is further configured to receive a note palette.

32. The apparatus of claim 21, wherein the visual rendering module is further configured to draw measure bars.

33. The apparatus of claim 21, wherein the visual rendering module is further configured to draw annotations.

34. The apparatus of claim 21, wherein the visual rendering module is further configured to draw system markings.

35. The apparatus of claim 21, wherein each atomic music segment comprises at least one lyric segment.

36. A system for rendering music within a browser window, the system comprising:

a server configured to provide digitally encoded music;

a browser-equipped client configured to execute a script;

a browser script configured to receive a song comprising a plurality of notes and a plurality of lyric segments, the plurality of notes and the plurality of lyric segments partitioned into a time progressive sequence of atomic music segments, each atomic music segment comprising:

a duration indicator that indicates a duration of the atomic music segment, a note indicator for each note within the song having an onset time that corresponds to an onset time for the atomic music segment, and a lyric segment for each lyric within the song having an onset time that corresponds to the onset time for the atomic music segment;

the browser script further configured to compute a segment width for each atomic music segment within a particular music system and allocate a display region within a browser window for each atomic music segment within the particular music system, each display region having a display width that corresponds to the segment width for the corresponding atomic music segment;

the browser script further configured to render a note body for each note of each atomic music segment within the particular music system within the display region corresponding to each atomic music segment; and the browser script further configured to play the song in response to a user-initiated event.

37. The system of claim 36, wherein the browser script is further configured to sequentially highlight the display regions for the atomic music segments in response to a change in a playback position.

38. A method to format music, the method comprising:

encoding a song into a plurality of notes and a plurality of lyric segments each note having an onset time associated therewith;

creating an atomic music segment data structure for each unique onset time; each atomic music segment comprising a duration indicator that indicates a duration of the atomic music segment, a note indicator for each note within the song having an onset time that corresponds to an onset time for the atomic music segment, and a lyric segment for each lyric within the song having an onset time that corresponds to the onset time for the atomic music segment;

assigning each note having a particular onset time to the atomic music segment corresponding to the particular onset time;

assigning each lyric segment to an atomic music segment; and visually or sonically rendering the song.

39. The method of claim 38, further comprising partitioning the song with a plurality of system indicators.

40. The method of claim 38, further comprising partitioning the song with a plurality of measure indicators.

41. The method of claim 38, further comprising including an annotation indicator within the song.

42. The method of claim 38, further comprising creating a note indicator for a note.

43. The method of claim 42, wherein the note indicator comprises an octave indicator.

44. The method of claim 42, wherein the note indicator comprises a semitone indicator.

45. A method for rendering music within a browser window, the method comprising:

displaying at least a portion of a song within a browser window as a sequence of display regions corresponding to atomic music segments, each atomic music segment comprising data immediately accessible to the browser, the data comprising:

a duration indicator that indicates a duration of the atomic music segment, a note indicator for each note within the song having an onset time that corresponds to an onset time for the atomic music segment, and a lyric segment for each lyric within the song having an onset time that corresponds to the onset time for the atomic music segment; and highlighting a display region corresponding to a selected atomic music segment within the song.

46. The method of claim 45, wherein the selected atomic music segment progresses in response to a changed playback position.

47. The method of claim 45, wherein the selected atomic music segment is selected in response to a user-initiated event.

48. A method for rendering music within a browser window, the method comprising:

receiving a note palette, the note palette comprising a plurality of sampled sounds corresponding to a plurality of notes referenced in a song;

receiving a plurality of atomic music segments, each atomic music segment comprising:

a duration indicator that indicates a duration of the atomic music segment, a note indicator for each note within the song having an onset time that corresponds to an onset time for the atomic music segment, and a lyric segment for each lyric within the song having an onset time that corresponds to the onset time for the atomic music segment; and mixing the digital samples that correspond to each note in an atomic music segment to provide a digital audio segment.

49. The method of claim 48, wherein mixing the digital samples comprising invoking a play function for each note and specifying a note envelope.

50. The method of claim 48, further comprising muting a selected voice.

51. The method of claim 48, further comprising attenuating a selected voice.

52. The method of claim 48, further comprising mixing a subsequent atomic music segment concurrent with playing the digital audio segment.

53. The method of claim 48, wherein the plurality of sampled sounds is limited to notes referenced in the song.

54. A method for rendering music within a browser window, the method comprising:

displaying a song within a browser window, the song comprising a plurality of user selectable display regions, each user selectable display region corresponding to an atomic music segment comprising:

a duration indicator that indicates a duration of the atomic music segment, a note indicator for each note within the song having an onset time that corresponds to an onset time for the atomic music segment, and a lyric segment for each lyric within the song having an onset time that corresponds to the onset time for the atomic music segment;

determining a set of selected voices from at least one interface control; and playing the selected voices within the song.

55. The method of claim 54, further comprising dynamically changing the selected voices during playback.

56. A method for rendering music within a browser window, the method comprising:

displaying a song within a browser window, the song comprising a plurality of user selectable display regions, each user selectable display region corresponding to an atomic music segments comprising:

a duration indicator that indicates a duration of the atomic music segment, a note indicator for each note within the song having an onset time that corresponds to an onset time for the atomic music segment, and a lyric segment for each lyric within the song having an onset time that corresponds to the onset time for the atomic music segment;

determining a desired volume for a particular voice from at least one interface control; and playing the song with the particular voice adjusted to the desired volume.

57. The method of claim 56, further comprising dynamically changing the volume of the particular voice during playback.

58. A method for rendering music within a browser window, the method comprising:

displaying at least one music system within a browser window, the browser window comprising a plurality of user selectable display regions, each user selectable display region corresponding to an atomic music segments comprising:

a duration indicator that indicates a duration of the atomic music segment, a note indicator for each note within the song having an onset time that corresponds to an onset time for the atomic music segment, and a lyric segment for each lyric within the song having an onset time that corresponds to the onset time for the atomic music segment; and automatically scrolling the at least one music system in response to completing playback of a current system.

59. The method of claim 58, wherein completing playback comprises generating a plurality of digital audio segments.

60. The method of claim 59, wherein generating a plurality of digital audio segments comprises mixing a plurality of digital samples that correspond to each note in an atomic music segment.

61. The method of claim 58, further comprising muting a selected voice.

62. A method for rendering music within a browser window, the method comprising:

storing a song as a sequence of atomic music segments, each atomic music segment comprising:

a duration indicator that indicates a duration of the atomic music segment, a note indicator for each note within the song having an onset time that corresponds to an onset time for the atomic music segment, and a lyric segment for each lyric within the song having an onset time that corresponds to the onset time for the atomic music segment; and providing the song to a browser-equipped client.

63. A method for rendering music within a browser window, the method comprising:

receiving a song from a server, the song comprising a plurality of atomic music segments, each atomic music segment comprising:

a duration indicator that indicates a duration of the atomic music segment, a note indicator for each note within the song having an onset time that corresponds to an onset time for the atomic music segment, and a lyric segment for each lyric within the song having an onset time that corresponds to the onset time for the atomic music segment;

displaying the song within a browser window on a browser-equipped computer; and streaming audio corresponding to the song to the browser-equipped computer.

64. A method for rendering music within a browser window, the method comprising:

displaying at least a portion of a song within a browser window, the browser window comprising a plurality of user selectable display regions, each display region corresponding to an atomic music segment comprising:

a duration indicator that indicates a duration of the atomic music segment, a note indicator for each note within the song having an onset time that corresponds to an onset time for the atomic music segment, and a lyric segment for each lyric within the song having an onset time that corresponds to the onset time for the atomic music segment;

searching the at plurality of lyric segments for a user-provided character sequence.

65. A method for rendering music within a browser window, the method comprising:

receiving a song from a server, the song comprising a plurality of voices; and displaying at least a portion of the song within a browser window, the browser window comprising a plurality of user selectable display regions, each user selectable display region corresponding to an atomic music segment comprising:

a duration indicator that indicates a duration of the atomic music segment, a note indicator for each note within the song having an onset time that corresponds to an onset time for the atomic music segment, and a lyric segment for each lyric within the song having an onset time that corresponds to the onset time for the atomic music segment;

visually reformatting the song displayed within the browser window in response to a user inactivating a selected voice of the plurality of voices.

* * * * *